United States Patent [19]

Hasselberger

[11] 4,099,814
[45] Jul. 11, 1978

[54] GLOVE COMPARTMENT SHELF

[76] Inventor: John Hasselberger, Box 846, East Hampton, N.Y. 11937

[21] Appl. No.: 757,922

[22] Filed: Jan. 10, 1977

[51] Int. Cl.² .................. A47B 96/02; B60R 7/06
[52] U.S. Cl. ......................... 312/317 R; 108/92; 296/37.12; 312/242; 312/351
[58] Field of Search ........... 312/351, 242, 314, 317 R, 312/317 A, 246; 108/92; 296/37.12

[56] References Cited

U.S. PATENT DOCUMENTS

| 2,226,434 | 12/1940 | Mirsm | 296/37.12 |
| 2,275,060 | 3/1942 | Griffin | 312/246 |
| 2,820,687 | 1/1958 | Waring | 296/37.12 |

FOREIGN PATENT DOCUMENTS

| 158,107 | 8/1954 | United Kingdom | 312/184 |

Primary Examiner—Paul R. Gilliam
Assistant Examiner—Alex Grosz

[57] ABSTRACT

A shelf for a glove compartment of an automobile including first and second substantially horizontal shelf portions supported by substantially vertical U-shaped end portions within the glove compartment of an automobile. The shelf is adjustable to fit any size glove compartment by an overlapping axially extending slot on one of the shelf components sitting on top of a transverse slot in the other one of the shelf components receiving therethrough an elongated threaded shank retaining the components in adjusted relation. Because of the slot arrangement, one of the horizontal shelf components may be pivoted relative to the other and adjusted relative to the other in an axial direction to exactly fit the interior of a glove compartment.

3 Claims, 6 Drawing Figures

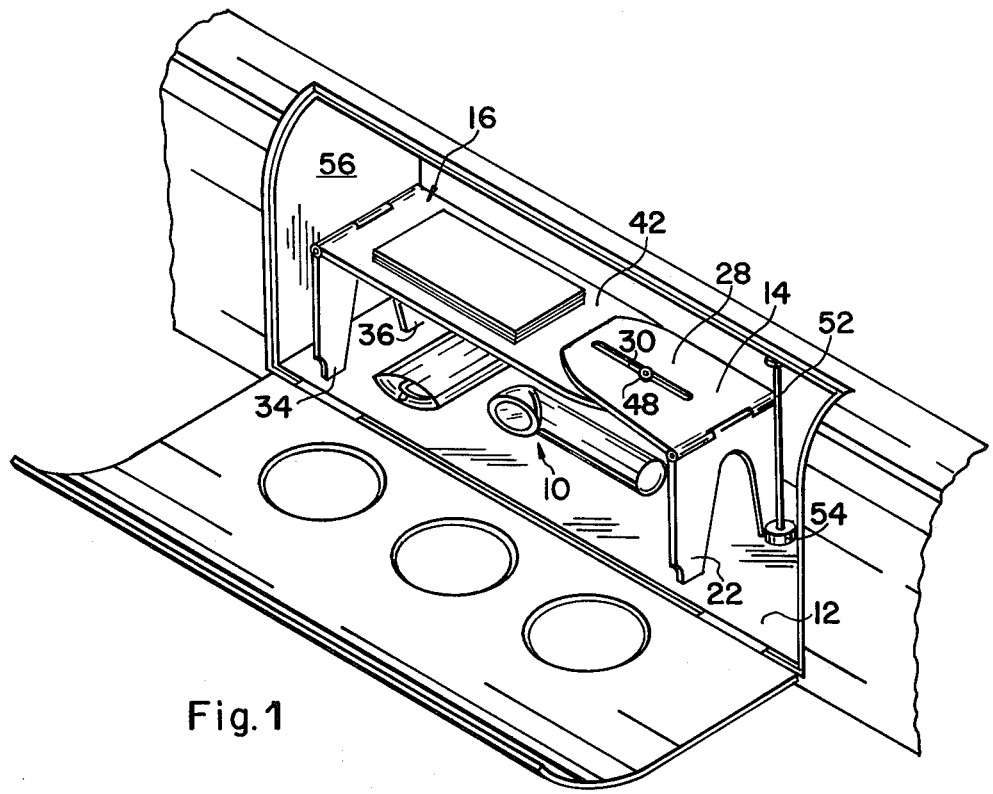
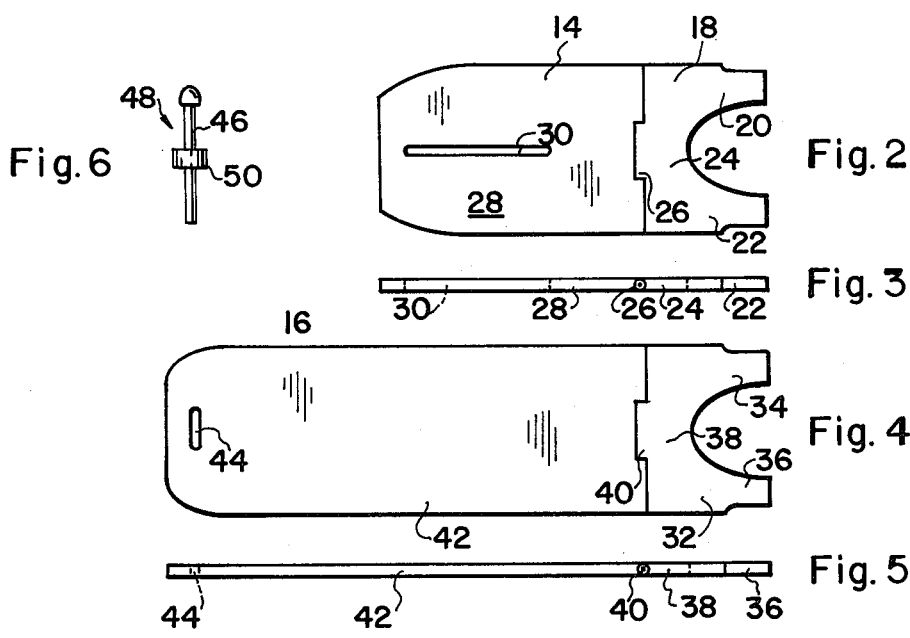

GLOVE COMPARTMENT SHELF

PRIOR ART

The following patents are considered to be pertinent:
U.S. Pat. No. 2,197,870
U.S. Pat. No. 2,215,208
U.S. Pat. No. 2,275,060
U.S. Pat. No. 2,592,032
U.S. Pat. No. 2,657,967
U.S. Pat. No. 2,905,370
U.S. Pat. No. 2,820,687

BACKGROUND OF THE INVENTION

This invention relates to a shelf, and more particularly, a shelf designed for use in automobile glove compartments.

Automobile glove compartments usually contain a single space of limited dimension wherein a number of small articles are placed. However, such articles are usually difficult to find because of the lack of organization in placing such articles within the glove compartment. Accordingly, this invention relates to a shelf adapted to be installed in the glove compartment to divide the space in the glove compartment into upper and lower spaces for storage of various articles which may be conveniently found and selected when needed.

While the prior art shows shelves, in general, for the same purpose, the glove compartment space of an automobile of a different manufacturer and make are usually of different dimensions and have curved sides. Accordingly, the glove compartment shelves of the prior art could not fit within such a space. The shelf of the present invention, however, is adjustable to fit any size or configuration of glove compartment.

SUMMARY OF THE INVENTION

In accordance with the present invention, the glove compartment shelf includes two adjustable components adapted to be adjusted relative to each other to form a composite shelf which will fit the interior space of a glove compartment.

One of the components includes a horizontal shelf pivotally connected to a pair of supporting legs and has an elongated slot formed in its top surface for overlapping a similar shelf component provided with a transverse slot aligned beneath the axial slot on the first component. A locking nut and screw is inserted through both of the slots so that the slots can be adjusted both along the axis of the glove compartment and along the depth thereof. Further, one of the shelf components may be turned or rotated relative to the other by the slot arrangement so as to fit exactly in abutment with the curved sides, if any, of the glove compartment space.

If the compartment shelf components are still not long enough to fit exactly within the interior of the glove compartment, an extension post may be placed in abutment with one end of the composite shelf and clamped between the top and bottom of the glove compartment to hold the shelf in place.

BRIEF DESCRIPTION OF THE DRAWING

Further objects and advantages of the invention will become apparent from the following description and claims, and from the accompanying drawing, wherein:

FIG. 1 is a perspective view of the shelf of the present invention mounted within the glove compartment of an automobile;

FIG. 2 is a top plan view of one of the components of the shelf of FIG. 1;

FIG. 3 is a front view in elevation of the shelf component of FIG. 2;

FIG. 4 is a top plan view of a second shelf component of the shelf of FIG. 1;

FIG. 5 is a front view in elevation of the shelf component of FIG. 4; and

FIG. 6 is a front view in elevation of a locking nut and screw used with the shelf components of FIG. 2 and FIG. 4.

DETAILED DESCRIPTION OF THE PREFERRED EMBODIMENT

Referring now to the drawing in detail, wherein like numerals indicate like elements throughout the several views, the shelf 10 of the present invention is adapted to fit within a glove compartment 12 of an automobile.

Shelf 10 includes a first component 14 and a second component 16 which are adjustably connected together to fit any size of glove compartment 12.

Component 14 includes a U-shaped support 18 having a pair of legs 20 and 22 connected by a bight 24 pivotally connected by a hinge 26 to a horizontal support surface 28 having an elongated slot 30 formed therein extending along the axis of shelf portion 28.

Similarly, the second component 16 includes a generally U-shaped support 32 including a pair of spaced legs 34 and 36 and a bight portion 38 connected by a hinge 40 to a substantially horizontal shelf portion 42 provided with a slot 44 extending transverse to the axis of shelf portion 42.

Shelf 10 is assembled in a glove compartment 12 of an automobile by overlapping shelf portions 28 and 42 as illustrated in FIG. 1 with slot 30 over slot 44. The shank 46 of a locking screw 48 is inserted into the slots 30 and 44. A nut 50 on shank 46 is used to retain the shelf portions 28 and 42 in locked relation with respect to each other.

Shelf portions 28 and 42 can be adjusted relative to each other by loosening locking nut 50 and sliding shelf portion 28 relative to shelf portion 42 and the shank 46 of screw 48 along the axis of slot 30 so that the legs of each shelf portion are in abutment with the side walls of glove compartment 12. Further, each of the shelf portions 28 and 42 can be adjusted with respect to the curvature and depth of glove compartment 12 by pivoting each of the shelf portions relative to the shank 46 of screw 48 and sliding one portion transversely relative to the other so as to obtain an exact fit to the contour of compartment 12. As shown in FIG. 1, supporting legs of each shelf portion extend in a substantially vertical plane to support the shelf portions 28 and 42 in a substantially horizontal plane.

In the event glove compartment 12 is a greater length than the possible adjusted length of shelf portions 28 and 42, a substantially vertical post 52 having an adjustable mounting in a vertical direction on a nut 54 can be placed in glove compartment 12 between the base of the glove compartment and the roof of the compartment in abutment with one of the legs 20 or 22 supporting shelf portion 28 so that the overall shelf 10 is clamped or locked between the post and the far wall 56 of glove compartment 12.

Articles can be disposed beneath shelf portions 28 and 42 as well as supported on shelf portions 28 and 42 as indicated in FIG. 1 to organize the articles so that they can be readily found in the glove compartment 12.

While a specific embodiment of a glove compartment shelf has been disclosed in the foregoing description, it will be understood that various modifications within the spirit of the invention may occur to those skilled in the art. Therefore, it is intended that no limitations be placed on the invention except as defined by the scope of the appended claims.

I claim:

1. A shelf positioned in a glove compartment of an automobile, comprising:
    a first and second shelf component,
    each of said shelf components including a substantially horizontal and a substantially vertical portion, said vertical portion of each of said shelf components including
    a substantially U-shaped end portion pivotally connected to one end of said horizontal shelf portion,
    said U-shaped end portion including a pair of legs for supporting said horizontal shelf portion, and a hinge connecting the bight portion of said support to said horizontal shelf; means for adjustable connecting the horizontal portions of said shelf components including
    an elongated slot in the horizontal portion of one of said shelf components adapted to be overlapped with a relatively transverse slot in the horizontal portion of the other of said shelf components;
    an elongated threaded shank received through said overlapping slots in said horizontal shelf portions, and
    a nut threadedly received on the end of said shank,
    so that one of said shelf components may be adjusted axially, laterally, and angularly with respect to the other.

2. The shelf of claim 1 including
    post means for abutment with one end of said shelf in a glove component for firmly clamping said shelf between a side wall of said glove compartment and said post.

3. The shelf of claim 2 wherein said post includes
    a vertical shank threadedly connected at one end to a nut whereby the height of said post can be adjusted.

* * * * *